(12) United States Patent
Ito et al.

(10) Patent No.: US 11,440,185 B2
(45) Date of Patent: Sep. 13, 2022

(54) MULTI-OPERATION UNIT INTEGRATION DEVICE, CONTROL METHOD THEREFOR, AND AUTONOMOUS LEARNING TYPE ROBOT DEVICE

(71) Applicant: Hitachi, Ltd., Tokyo (JP)

(72) Inventors: Hiroshi Ito, Tokyo (JP); Kenjiro Yamamoto, Tokyo (JP); Yusuke Hieida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 420 days.

(21) Appl. No.: 16/609,295

(22) PCT Filed: Mar. 2, 2018

(86) PCT No.: PCT/JP2018/007966
§ 371 (c)(1),
(2) Date: Oct. 29, 2019

(87) PCT Pub. No.: WO2019/003495
PCT Pub. Date: Jan. 3, 2019

(65) Prior Publication Data
US 2020/0055183 A1 Feb. 20, 2020

(30) Foreign Application Priority Data
Jun. 30, 2017 (JP) ............................. JP2017-128137

(51) Int. Cl.
*G06F 17/00* (2019.01)
*B25J 9/16* (2006.01)
*B25J 9/08* (2006.01)
*B25J 13/00* (2006.01)
*G05B 13/02* (2006.01)

(52) U.S. Cl.
CPC ................. *B25J 9/163* (2013.01); *B25J 9/08* (2013.01); *B25J 13/00* (2013.01); *G05B 13/0265* (2013.01)

(58) Field of Classification Search
CPC ..... B25J 9/163; B25J 9/08; B25J 13/00; B25J 5/00; G05B 13/0265; G05B 2219/40302; G05B 2219/40304
(Continued)

(56) References Cited

U.S. PATENT DOCUMENTS 6,708,068 B1 3/2004 Sakaue
9,910,054 B2 * 3/2018 Johns ...................... G01N 21/27
(Continued)

FOREIGN PATENT DOCUMENTS

| JP | 2001-038663 A | 2/2001 |
| WO | 00/41853 A1 | 7/2000 |
| WO | WO-2019003495 A1 * | 1/2019 ............... B25J 13/00 |

OTHER PUBLICATIONS

Kanata Suzuki et al., "Generation of folding operation generation of flexible objects by multidegree-of-freedom robot using deep learning", The 78th National Convention of IPSJ, Mar. 10, 2015, Keio University.
(Continued)

*Primary Examiner* — Ronnie M Mancho
(74) *Attorney, Agent, or Firm* — Mattingly & Malur, PC

(57) ABSTRACT

A multi-operation unit integration device having scale expandability and includes a plurality of operation units each of which includes a movable unit; and an integration module. The integration module includes an operation timing unit that gives operation timings of the plurality of operation units based on an operation instruction input from an outside, and the operation unit includes: a plurality of operation learning units that generate a control signal given to the movable unit according to an operation timing signal from the operation timing unit of the integration module; drive means for driving the movable unit of the operation unit according to the control signal; and a sensor that detects a state quantity of the movable unit driven by the drive
(Continued)

means. An autonomous learning type robot device is configured using the multi-operation unit integration device as a control portion.

9 Claims, 3 Drawing Sheets

(58) Field of Classification Search
USPC .......................................................... 700/246
See application file for complete search history.

(56) References Cited

U.S. PATENT DOCUMENTS

| | | | |
|---|---|---|---|
| 10,549,421 B2 * | 2/2020 | Matsumoto | B25J 9/163 |
| 10,625,416 B2 * | 4/2020 | Nakamura | B25J 13/02 |
| 10,640,392 B2 * | 5/2020 | Fujioka | F22D 11/02 |
| 10,768,583 B2 * | 9/2020 | Fuji | G05B 13/0265 |
| 11,224,969 B2 * | 1/2022 | Skaaksrud | B60W 10/04 |
| 2002/0143436 A1 | 10/2002 | Takamura | |
| 2019/0054631 A1 * | 2/2019 | Govindarajan | B25J 9/1679 |
| 2020/0026246 A1 * | 1/2020 | Nakagawa | G05B 9/03 |
| 2020/0055183 A1 * | 2/2020 | Ito | G05B 13/0265 |
| 2020/0070343 A1 * | 3/2020 | Thomaz | B25J 19/02 |

OTHER PUBLICATIONS

International Search Report of PCT/JP2018/007966 dated Apr. 24, 2018.

* cited by examiner

MULTI-OPERATION UNIT INTEGRATION DEVICE, CONTROL METHOD THEREFOR, AND AUTONOMOUS LEARNING TYPE ROBOT DEVICE

TECHNICAL FIELD

The present invention relates to a multi-operation unit integration device, a control method therefor, and an autonomous learning type robot device, and particularly relates to an operation unit including an actuator, a sensor, and a learning unit, a multi-operation unit integration device constructed with an integration module that integrates a plurality of operation units, a multi-operation unit integration device control method, and an autonomous learning type robot device.

BACKGROUND ART

In constructing a conventional robot device, enormous programming and high expertise are required, which results in an inhibiting factor of introducing the robot device. Thus, there has been proposed an autonomous learning type robot device that decides operation by itself based on information about various sensors attached to the robot device.

The autonomous learning type robot device is expected to generate flexible operation with respect to various environmental changes by storing and learning an operation experience of the robot device itself. Examples of the operation experience of the robot device include a method in which an operator or a user directly teaches and stores the operation in the robot device and a method for imitating the operation of a person or another robot device.

In general, the autonomous learning type robot device includes a learning device called a learning unit, which stores sensor information during the operation experience and adjusts a parameter in order to generate the operation. The stored operation is called learning data, the parameter adjustment is called learning, and the learning of the learning unit is performed using the learning data. The learning unit defines an input and output relation in advance and repeats the learning such that an expected output value is output with respect to an input value to the learning unit.

For example, joint angle information about the robot device during a certain operation experience is stored as time series information. It is assumed that using the obtained learning data, the joint angle information at time (t) is input to the learning unit and time series learning is performed so as to predict the joint angle information at time (t+1). The joint angle information about the robot device is sequentially input to the learning unit in which the learning is completed, which allows the autonomous learning type robot device to automatically generate the operation according to an own state.

As to the learning of the robot device, in NPL 1, a plurality of operation patterns can be generated based on the sensor information by integratedly learning a plurality of pieces of sensor information, and ability to automatically generate the operation according to the environment change is acquired.

In a robot device disclosed in PTL 1 constructed with a plurality of operation units, an operation history of the operation unit is stored in a storage, and the operation can be decided even if the operation unit is replaced, so that the robot device that can improve usability is constructed. An operation result of each operation unit is evaluated based on a predetermined reference to optimize the operation, which allows acquirement of ability to decide the operation suitable for a command given from an outside.

CITATION LIST

Patent Literature

PTL 1: International Publication No. WO 00/41853

Non-Patent Literature

NPL 1: "Generation of folding operation generation of flexible objects by multidegree-of-freedom robot using deep learning", Kanata Suzuki, Shiro Takahashi, Gordon Chen, and Tetsuya Ogata, The 78th National Convention of IPSJ, Mar. 10, 2015, Keio University

SUMMARY OF INVENTION

Technical Problem

According to NPL 1, the autonomous learning type robot device can achieve generation of flexible operation with respect to various environmental changes. When a structure of the autonomous learning type robot device that has completed learning is changed, the number of inputs and outputs to and from the learning unit and a type of input and output information change. For this reason, it is necessary to store learning data again to learn the learning unit, which results in a problem in that it takes time and labor. It is difficult to apply the acquired learning unit to a robot having a different structure and different degrees of freedom, and there is a problem in that it is not easy to use.

In PTL 1, the operation of each operation unit can be optimized because an operation result of each operation unit is updated based on a predetermined reference with respect to target operation. However, it is difficult to optimize the operation of the entire robot device.

The present invention has been made in consideration of the above points, and an object of the present invention is to provide a multi-operation unit integration device capable of generating the optimum operation of an entire device, a method for controlling the multi-operation unit integration device, and an autonomous learning type robot device having scalability.

Solution to Problem

According to one aspect of the present invention, in a multi-operation unit integration device including: a plurality of operation units each of which includes a movable unit; and an integration module, the integration module includes an operation timing unit that gives operation timings of the plurality of operation units based on an operation instruction input from an outside, and the operation unit includes: a plurality of operation learning units that generate a control signal given to the movable unit according to an operation timing signal from the operation timing unit of the integration module; drive means for driving the movable unit of the operation unit according to the control signal; and a sensor that detects a state quantity of the movable unit driven by the drive means, and an autonomous learning type robot device is configured using the multi-operation unit integration device as a control portion.

According to another aspect of the present invention, a method for controlling a multi-operation unit integration device including a plurality of operation units each of which includes a movable unit, and an integration module. The integration module disassembles a series of operation instructions input from an outside into individual operation instructions, designates the individual operation unit that undertakes the disassembled operation instruction, and gives an operation timing signal to the designated operation unit, and the designated operation unit drives the movable unit in response to the operation timing signal from the integration module.

Advantageous Effects of Invention

According to the present invention, the operation units can be exchanged, the scalability of the autonomous learning type robot device can be achieved, and the optimum operation of the entire autonomous learning type robot device can be generated.

DESCRIPTION OF EMBODIMENTS

Embodiments of the present invention will be described with reference to the drawings.

First Embodiment

Figure 1:
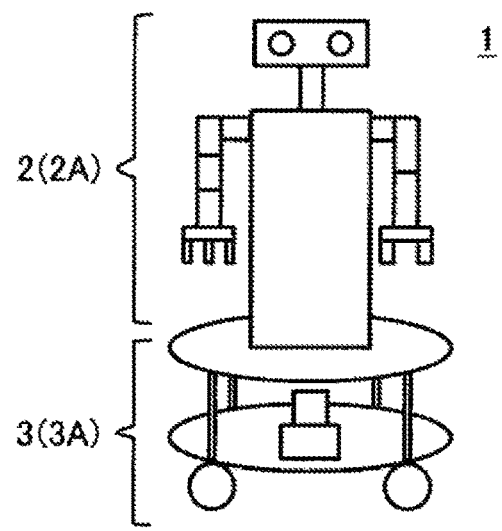
FIG. 1 is a view illustrating a typical configuration example of an autonomous learning type robot device.

FIG. 1 illustrates a typical configuration example of an autonomous learning type robot device. A typical autonomous learning type robot device 1 is constructed with a plurality of operation units. In the example of FIG. 1, an upper limb operation unit 2 and a lower limb operation unit 3 are coupled to form the autonomous learning type robot device 1. In the example of FIG. 1, an operation unit 2A selected as the upper limb operation unit 2 is constructed with a head, a body, and an arm, and an operation unit 3A selected as the lower limb operation unit 3 is constructed with a knee and a leg, and the humanoid autonomous learning type robot device 1 is constructed by coupling the operation units 2A and the operation unit 3A. Each of the operation unit 2 and 3 includes a sensor and an operation learning unit in order to autonomously generate the operation. A unit of a region where the operation unit is disposed can be set in each unit such as the head, the body, and the arm. In this case, by way of example, the operation unit is disposed for two of the upper and lower limbs.

Figure 2:
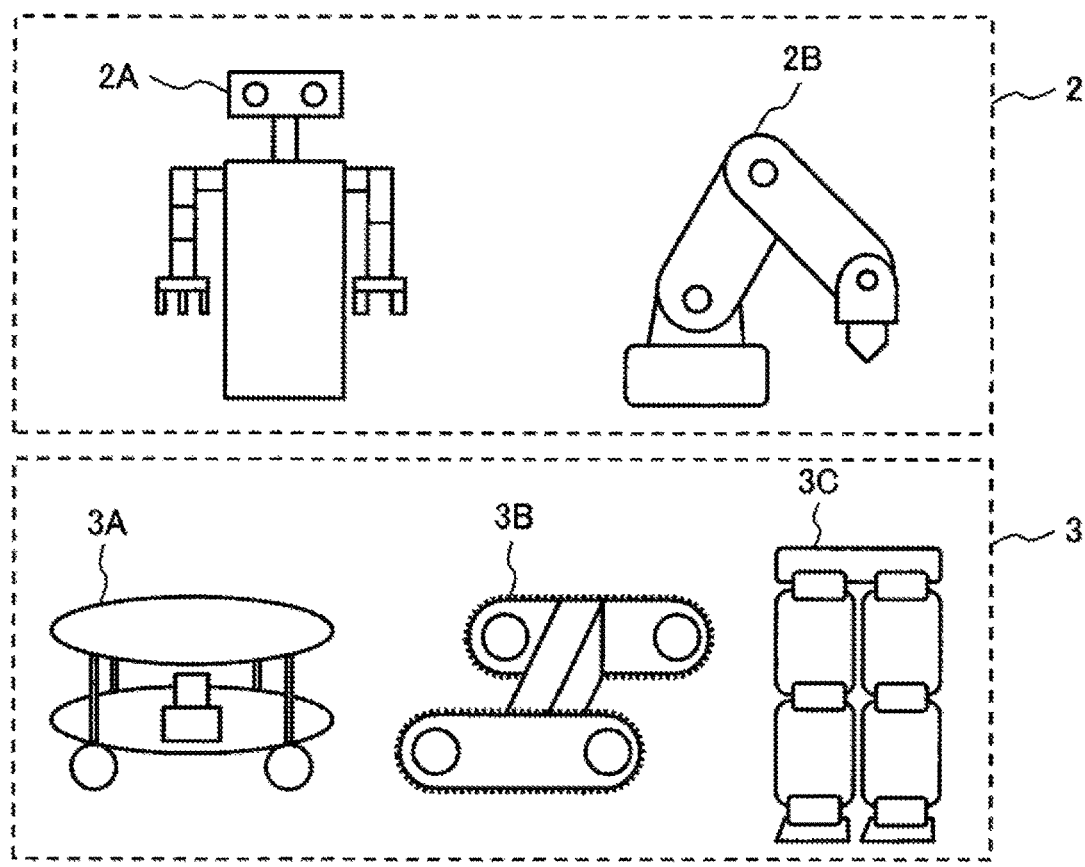
FIG. 2 is a view illustrating an operation unit group of each operation unit constituting the autonomous learning type robot device.

FIG. 2 is a view illustrating an operation unit group of each operation unit constituting the autonomous learning type robot device. The operation unit having some functions can be applied to the operation units 2 and 3 of the upper and lower limbs depending on the functions to be performed as the upper and lower limbs of the autonomous learning type robot device 1. For example, as illustrated in FIG. 2, one upper limb operation unit 2A is selected as the upper limb operation unit 2 from an upper limb operation unit group 2 including a plurality of types of operation units 2A, 2B, 2C, one lower limb operation unit 3A is selected as the lower limb operation unit 3 from a lower limb operation unit group 3 including a plurality of types of operation units 3A, 3B, and the upper limb operation unit 2A and the lower limb operation unit 3A are coupled together in a predetermined state, which allows the construction of the autonomous learning type robot device. As described above, the autonomous learning type robot device having various operations and various functions can be constructed by the combination of the two operation units of the upper and lower limbs.

In the autonomous learning type robot device 1, when it is necessary to replace the upper limb operation unit 2A, the upper limb operation unit 2B is selected from the upper limb operation unit group 2 and replaced with the currently-coupled upper limb operation unit 2A, which allows the operation unit to be changed. Thus, the scalability of the autonomous learning type robot device can be achieved.

A method for operating the autonomous learning type robot device will be described below. In each operation unit in the upper limb operation unit group 2 of FIG. 2, a plurality of operation learning units include a program and a learning function in order to smoothly perform each of a plurality of operations, such as an object gripping operation and a door opening operation, which are an operation function that should be performed as the upper limb operation unit. In each operation unit in the lower limb operation unit group 3, a plurality of operation learning units include a program and a learning function in order to smoothly perform each of a plurality of operations, such as movement to a destination and obstacle avoidance, which are an operation function that should be performed as the lower limb operation unit.

Each operation unit to which an operation instruction is given can select the operation learning unit corresponding to the operation instruction from the plurality of operation learning units, and operate autonomously based on the sensor information. For example, when the operation instruction given to the upper limb operation unit 2A is the "door opening operation", the upper limb operation unit 2A can select the operation learning unit for the "door opening operation" from the plurality of operation learning units, and operate autonomously based on the sensor information. Similarly, for example, when the operation instruction given to the lower limb operation unit 3A is "door passing operation", the lower limb operation unit 3A can select the operation learning unit for the "door passing operation" from the plurality of operation learning units, and operate autonomously based on the sensor information.

However, the autonomous learning type robot device 1 cannot generate "door opening and passing operation" in which the "door opening operation" of the upper limb operation and the "door passing operation" of the lower limb operation are combined even if the upper limb operation unit 2A and the lower limb operation unit 3A are simply coupled together.

In the present invention, an integration module that manages operation timing of each operation unit is provided such that the operation units can perform cooperative operation, thereby performing the cooperative operation between the operation units.

Figure 3:
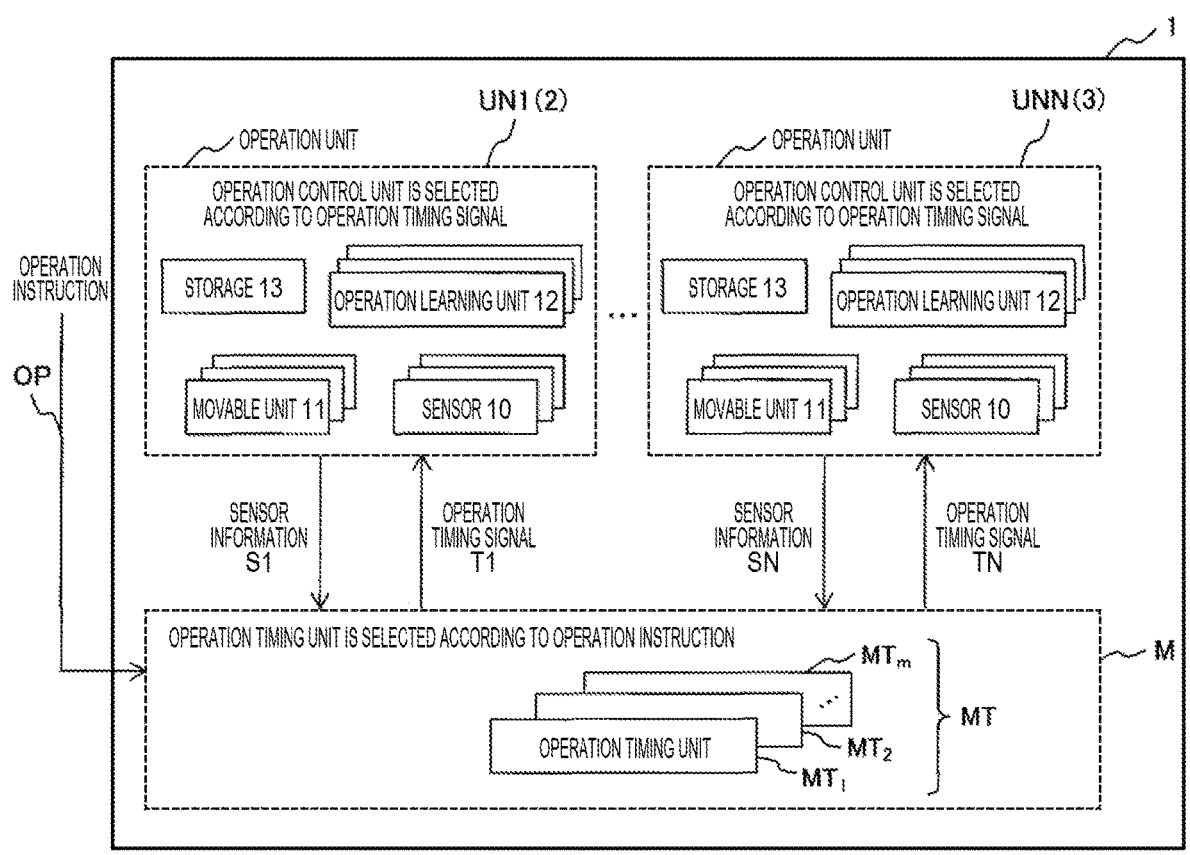
FIG. 3 is a view illustrating a configuration example of a multi-operation unit integration device including an integration module that manages operation timing of each operation unit.

FIG. 3 illustrates a configuration example of a multi-operation unit integration device including the integration module that manages the operation timing of each operation unit. FIG. 3 illustrates the multi-operation unit integration device constructing the autonomous learning type robot device that operates based on information from the outside.

The multi-operation unit integration device in FIG. 3 includes a plurality of operation units UN (UN 1, . . . , UNN) and an integration module M. Among the plurality of operation units UN, for example, UN1 corresponds to the upper limb operation unit 2, and UNN corresponds to the lower limb operation unit 3. The integration module M is disposed at an appropriate place of the autonomous learning type robot device. The integration module M sends an operation timing signal T (T1, . . . , TN) to each operation unit UN (UN1, . . . , UNN) according to the operation instruction information OP from the outside, and receives sensor information S (S1, . . . , SN) from each operation unit UN (UN1, . . . , UNN) to monitor each operation unit UN (UN1, . . . , UNN).

The integration module M includes a plurality of operation timing units MT (MT1, . . . , MTm) for each configuration (for example, the combination of the upper and lower limb operation units 2, 3) of the robot device and each operation instruction (for example, the operation contents of the upper and lower limb operation units 2, 3), and appropriately selects an operation timing unit based on the operation instruction. The operation timing unit MT generates the operation timing signal T (T1, . . . , TN) based on the sensor information S (S1, . . . , SN) of each operation unit UN (UN1, . . . , UNN), and sends the operation timing signal T (T1, . . . , TN) to each operation unit UN (UN1, . . . , UNN). The operation timing signal T (T1, . . . , TN) can give instructions such as an operation speed, operation stop, and operation restart of each operation unit in addition to operation start and operation end of each operation unit UN (UN1, . . . , UNN).

A typical operation example of the integration module M is that the configuration of the robot device is the combination of the upper and lower limb operation units 2A, 3A. When the operation instruction information OP from the outside is the "door opening and passing operation", one operation timing unit MT suitable for this condition is selected, the operation timing signal T1 of the "door opening operation" of the upper limb operation is sent to the operation unit UN1, and the operation timing signal TN of the "door passing operation" of the lower limb operation is sent to the operation unit UNN. In deciding each operation timing, the pieces of sensor information S1, SN about the operation unit UN1, UNN are referred, whether a standing position of the lower limb operation unit 3A is a position that does not interfere with the opening door is checked from the sensor information SN, and whether the upper limb operation unit 2A is located at a position at which the upper limb operation unit 2A performs a series of operations to the door operation without hindrance is checked from the sensor information S1, thereby sending each timing.

It can be said that the function of the integration module M is to disassemble a given series of operation instructions of the "door opening and passing operation" into individual operation instructions of the "door opening operation" and the "door passing operation" for each operation unit, and that the function of the integration module M is to designate the individual operation unit that undertakes the disassembled operation instruction.

On the other hand, the operation unit UN includes a plurality of operation learning units 12, a storage 13, and a plurality of movable units 11 in addition to the sensor 10.

For example, for the upper limb operation unit UN1(2), the plurality of operation learning units 12 include the program and the learning function in order to smoothly perform each of the plurality of operations, such as the object gripping operation and the door opening operation, which are the operation function that should be performed as the upper limb operation unit. For the lower limb operation unit UN2(3), the plurality of operation learning units 12 include the program and the learning function in order to smoothly perform each of the operation, such as the movement to the destination and the obstacle avoidance, which are the operation function that should be performed as the lower limb operation unit. For example, for the upper limbs, the movable unit 11 is appropriately provided for each portion that is a main node of the upper limb between the head, the body, and the arm, and for each node constituting the hand.

In the operation unit UN (for example, the upper limb operation unit UN1), the operation learning unit 12 specific to the door opening operation is selected from the plurality of operation learning units 12 based on the operation timing signal T for the operation instruction content (for example, the door opening operation) from the integration module M, and the movable unit 11 is operated using the sensor information obtained through the sensor 10 including a camera, a potentiometer, a force sensor, and a tactile sensor. The operation learning unit 12 specific to the door opening operation is given as individual operation instruction information broken down for each of the plurality of movable units 11 in order to perform the door opening operation by the cooperative operation of the plurality of movable units 11. Although not illustrated in FIG. 3, the operation learning unit 12 generates a control signal and gives the control signal to drive means, and the movable unit 11 is manipulated by the drive means. In manipulating the movable unit 11, the sensor information S from the sensor 10 is appropriately used as a feedback signal for position control or the like.

The operation unit UN can operate alone, and also operate based on the operation timing signal T and the operation instruction from the integration module M.

Consequently, for example, in the autonomous learning type robot device constructed with the upper limb operation unit UN1 that learns the door opening operation and the lower limb operation unit UNN that learns the door passage operation, when each operation unit UN (UN1, . . . UNN) is operated based on the operation timing signal T generated by the operation timing unit MT, the series of door opening and passing operations can be generated such that the lower limb operation unit UNN approaches the door, such that the upper limb operation unit UN1 generates the door opening operation, and such that the lower limb operation unit UNN pushes and opens the door. As described above, the autonomous learning type robot device 1 can appropriately operate each operation unit based on the operation instruction OP and the sensor information S given from the outside.

A method for acquiring the operation learning function in the operation timing unit MT of the integration module M will be described below. The operation timing unit MT learns the operation timing using an unsupervised learning method for acquiring the optimal operation timing by trial and error of the robot device based on the sensor information S about each operation unit UN or a supervised learning method in which the robot device self-organizes the operation timing by the learning based on the sensor information S when a person teaches several patterns of the operation timing to the autonomous learning type robot device.

In either method, evaluation is performed with respect to a predetermined evaluation reference such as operation efficiency and energy efficiency, and the learning is performed such that the evaluation becomes high. The optimal operation timing is generated by inputting the sensor information S about each operation unit UN to the operation timing unit MT learned based on a predetermined reference.

In the above configuration, the autonomous learning type robot device 1 learns and generates the operation timing of the operation unit suitable for the performance and the achievement of the operation instruction using the operation timing unit MT of the integration module M, which allows the generation of the optimum operation of the entire autonomous learning type robot device.

Figure 4:
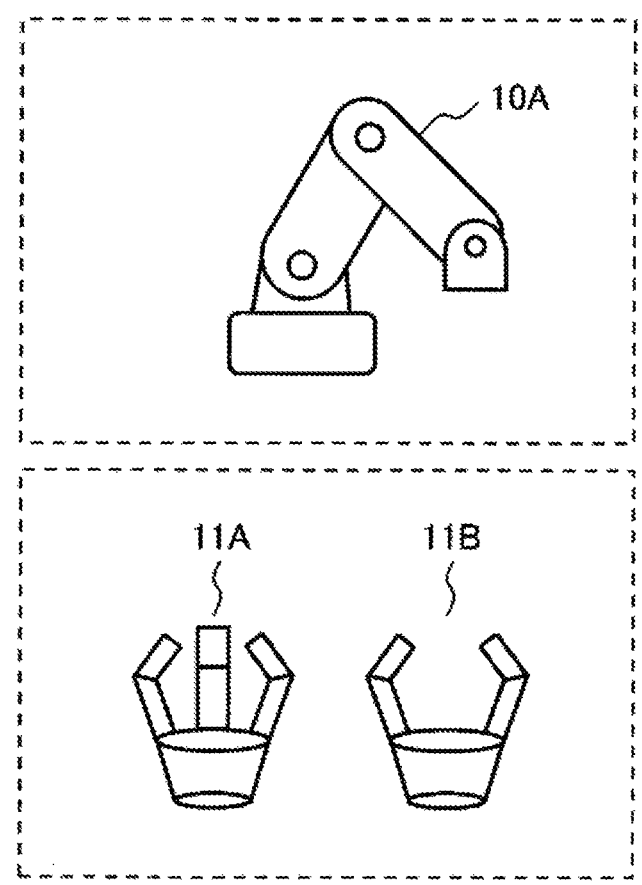
FIG. 4 is a view illustrating a modification of each operation unit group constituting the autonomous learning type robot device.

In the above embodiment, the upper limb operation unit 2 and the lower limb operation unit 3 are used as the operation unit. Alternatively, an example in which a unit of the operation unit is changed is illustrated in FIG. 4. FIG. 4 is a view illustrating a modification of each operation unit group constituting the autonomous learning type robot device. In FIG. 4, a robot arm operation unit 10A and one hand operation unit 11A selected from a plurality of types of hand operation unit groups 11 are coupled together to construct an autonomous learning type robot device.

In the above embodiment, one autonomous learning type robot device is constructed using the plurality of operation units UN and the integration module M. Alternatively, one autonomous learning type robot device may be constructed with one operation unit to construct a robot system including the plurality of autonomous learning robot devices and the integration module.

According to the present invention described above, the autonomous learning type robot device includes the plurality of operation units and the multi-operation unit integration device constructed with the integration module that learns and generates the operation generation timing of the operation unit, which allows the operation to be generated even if the configuration of the robot device is changed.

REFERENCE SIGNS LIST 1 autonomous learning type robot device
2 upper limb operation unit
3 lower limb operation unit
2A, 2B, 2C, 3A, 3B operation unit
UN(UN1 . . . UNN) operation unit
M integration module
OP operation instruction information
T(T1 . . . TN) operation timing signal
S(S1 . . . SN) sensor information
MT operation timing unit

The invention claimed is:

1. A multi-operation unit integration device comprising:
a plurality of operation units each of which includes a movable unit; and
an integration module,
wherein the integration module includes an operation timing unit that determines whether a situation where an operation unit of the plurality of operation units is placed is already learned based on sensor information detected by a sensor in the operation unit, and combines operation timings of the plurality of operation units, and
the operation unit of the plurality of operation units includes:
a plurality of operation learning units that each generates a control signal given to the movable unit according to an operation timing signal from the operation timing unit of the integration module;

drive means for driving the movable unit of the operation unit according to the control signal; and
a sensor that detects a state quantity of the movable unit driven by the drive means.

2. The multi-operation unit integration device according to claim 1, wherein
a plurality of the operation timing units in the integration module are selected according to an input operation instruction, and
the selected operation timing unit gives the operation timing signal to the operation learning unit in the operation unit, the operation learning unit being fixed by the operation timing unit.

3. The multi-operation unit integration device according to claim 1, wherein the operation timing signal of the integration module fixes an operation content of the operation unit and an operation start or stop timing.

4. The multi-operation unit integration device according to claim 1, wherein
the plurality of operation learning units in the operation unit are selected according to the operation timing signal from the operation timing unit, and
the selected operation learning unit gives the control signal to the drive means fixed by the operation learning unit.

5. The multi-operation unit integration device according to claim 1, wherein the operation learning unit acquires the control signal for the drive means based on at least one of the operation timing signal and the state quantity.

6. The multi-operation unit integration device according to claim 1, wherein
the operation unit includes a storage that stores the operation timing signal in driving the operation unit and the state quantity as learning data, and
a parameter of the operation learning unit is adjusted based on the learning data stored in the storage.

7. The multi-operation unit integration device according to claim 1, wherein the integration module adjusts a parameter of the operation timing unit so as to achieve predetermined operation.

8. An autonomous learning type robot device configured using the multi-operation unit integration device according to claim 1 as a control portion.

9. A method for controlling a multi-operation unit integration device including a plurality of operation units each of which includes a movable unit, and an integration module, wherein
the integration module inputs an operation instruction for a series of combined operations performed by the plurality of operation units, gives an operation timing signal to each of the plurality of operation units, decides time when the operation timing signal is given to each of the plurality of operation units, based on a presence or an absence of a learning experience detected by a sensor of each of the plurality of operation units, designates an individual operation unit of the plurality of operation units to drive the moveable unit, and gives the operation timing signal to the designated operation unit, and
the designated operation unit drives the movable unit in response to the operation timing signal from the integration module.

* * * * *